United States Patent [19]

McLellan

[11] Patent Number: 5,268,921
[45] Date of Patent: * Dec. 7, 1993

[54] MULTIPLE DISCHARGE GAS LASER APPARATUS

[76] Inventor: Edward J. McLellan, 422 Connie Ave., Los Alamos, N. Mex. 87544

[*] Notice: The portion of the term of this patent subsequent to Feb. 11, 2009 has been disclaimed.

[21] Appl. No.: 837,640

[22] Filed: Feb. 11, 1992

Related U.S. Application Data

[63] Continuation-in-part of Ser. No. 375,250, Jul. 3, 1989, Pat. No. 5,008,104.

[51] Int. Cl.⁵ .............................. H01S 3/097
[52] U.S. Cl. ............................ 372/87; 372/86; 372/97
[58] Field of Search ............... 378/87, 86, 69, 97; 372/38, 92; 219/121 LS

[56] References Cited

U.S. PATENT DOCUMENTS

| | | | |
|---|---|---|---|
| 5,088,104 | 2/1992 | McLellan | 372/86 |
| 5,138,627 | 8/1992 | Friede et al. | 372/86 |
| 5,142,547 | 8/1992 | Cirkel et al. | 372/86 |
| 5,153,892 | 10/1992 | Kawakubo et al. | 372/86 |

Primary Examiner—Jr. Scott
Attorney, Agent, or Firm—Samuel M. Freund

[57] ABSTRACT

Multiple discharge gas laser apparatus. A compact apparatus for simultaneously or individually generating a plurality of laser output beams in a selected pattern suitable for marking objects, for communications, or for remote chemical sensing or other remote sensing applications, among other uses, where all of the electrodes providing lasing gas excitation are located in a single gas volume and share a single output coupler is described. In this manner, all of the output beams are parallel in far field, to the extent variations in mode structure permit, without the necessity of undertaking detailed optical adjustments. Moreover, the focal plane of the output laser radiation is insensitive to significant positional variation of focusing optics utilized to increase the intensity thereof for marking purposes. Electrodes can be utilized for more than one discharge; that is, the direction of the discharge can be selected to involve any adjacent electrode having opposite charge polarity.

15 Claims, 10 Drawing Sheets

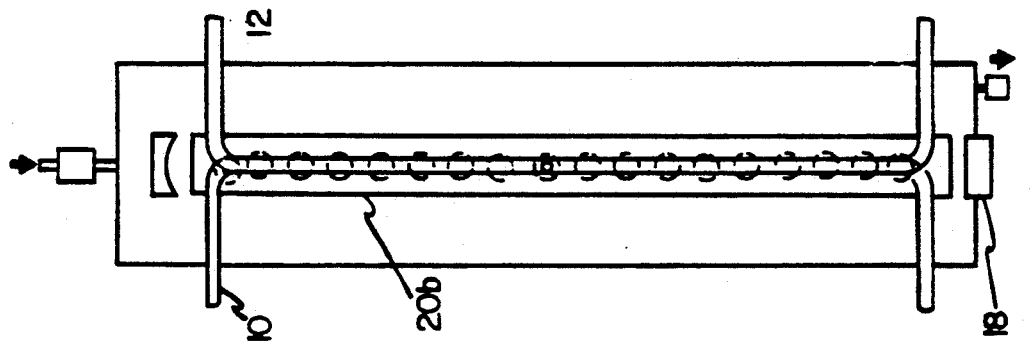
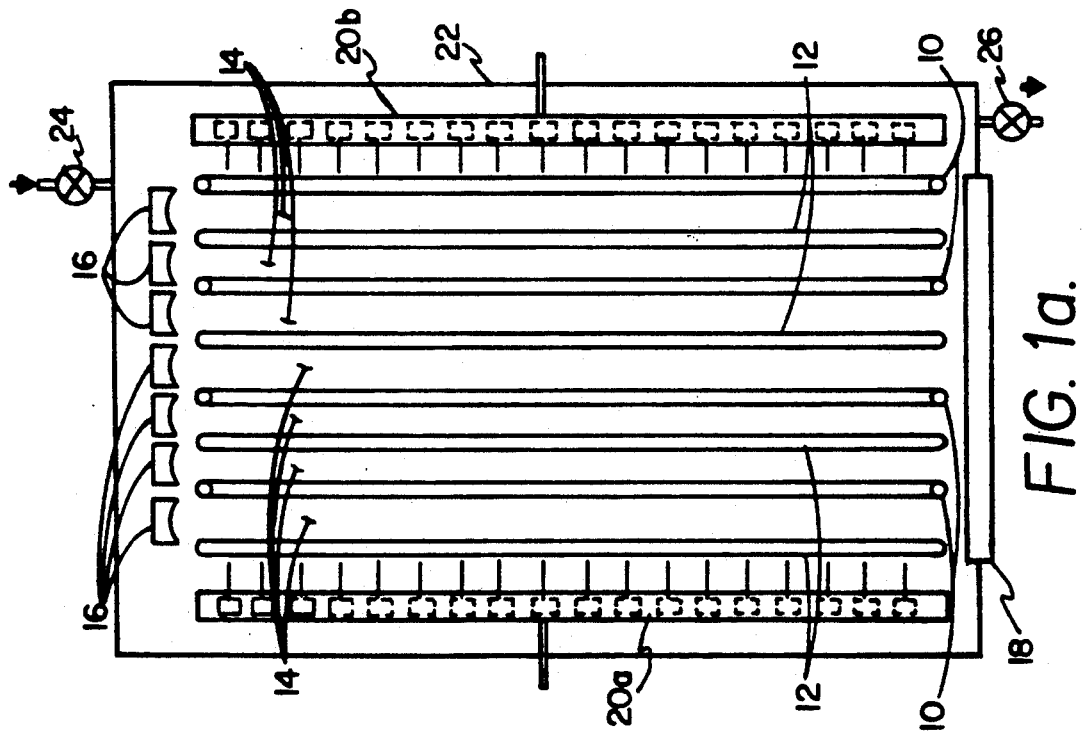

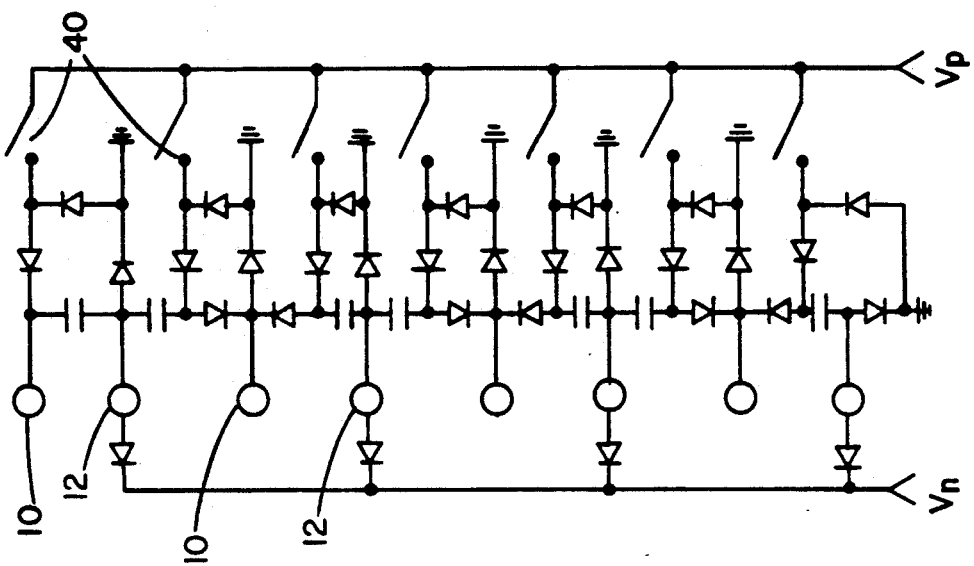
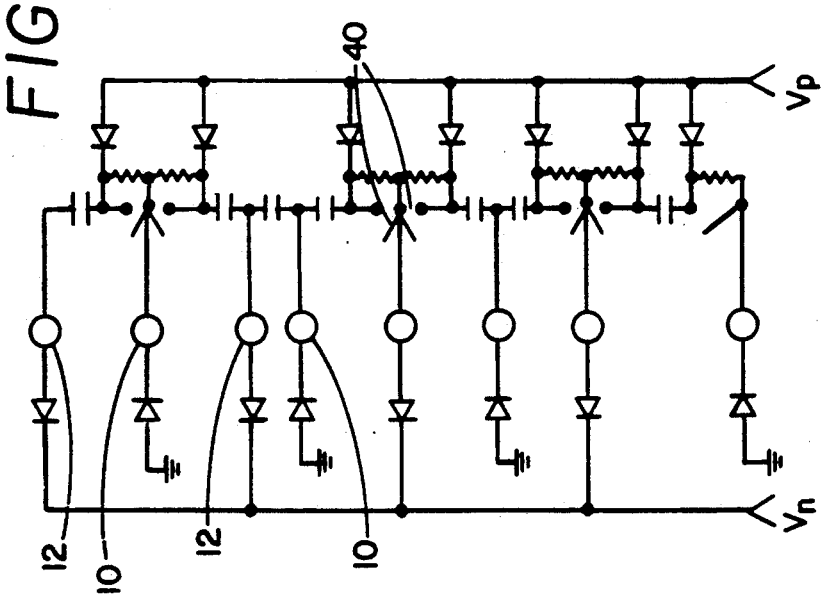
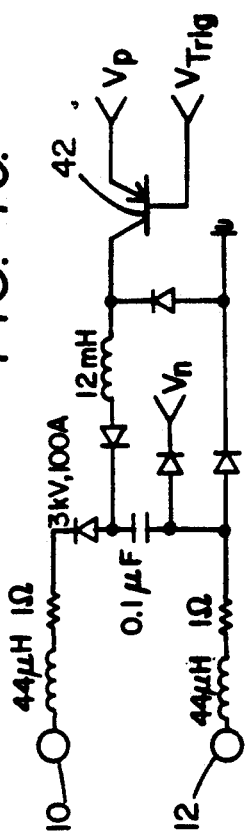
FIG. 4a.
FIG. 4b.
FIG. 4c.

A-A

A-A

0
MULTIPLE DISCHARGE GAS LASER APPARATUS

This is a continuation-in-part of copending application Ser. No. 07/375,250 filed on Jul. 3, 1989 now U.S. Pat. No. 5,088,104.

BACKGROUND OF THE INVENTION

The present invention relates generally to gas lasers, and more particularly to a multiple discharge gas laser apparatus capable of simultaneously providing several intense light beams suitable for marking objects by ablation of the surface thereof, for secure communications, and for remote sensing, among other applications.

Systems where multiple laser beams are required employ a plurality of independent laser sources which is both expensive and requires adjustment of numerous optical devices in order to locate the laser beams in the position or area of their utilization. For example, in "Laser Marking Apparatus," U.S. Pat. No. 4,652,722, issued to Joseph J. Stone and Leroy V. Sutter, Jr. on Mar. 24, 1987, the inventors describe a laser marking system which employs a plurality of individual lasers or a monolithic unit having a plurality of beams which are directed by fixed mirrors onto the surface to be marked. The surface to be marked is positioned on a conventional conveyor or other device suitable for linear motion across the laser beam. Each laser defines a collimated energy source which is focused, by an exit lens which has it focal plane approximately at the object to be marked, into a dot of chosen size. The incident angle of each laser source on the focusing lens is adjusted to provide a plurality of closely and focused dots which define a vertical column of light dots from which an alpha-numeric matrix can be obtained by modulation of the dots as the article moves past the exit lens. After initial adjustment, no further movement of the mirrors is required.

Accordingly, an object of the present invention is to provide a multiple discharge gas laser which has reduced numbers of electrodes over that required from the use of distinct lasing systems.

Another object of my invention is to provide a multiple discharge gas laser apparatus having laser beams which are substantially parallel in the far field except for mode structure.

Yet another object of my invention is to provide a multiple discharge gas laser apparatus suitable for marking objects by ablation of the surface thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the multiple discharge gas laser apparatus capable of generating a plurality of laser oscillations in a lasing gas of the present invention includes a plurality of spaced-apart, elongated, negatively charged electrodes having a chosen distance therebetween being disposed such that the long dimensions of each are substantially parallel, a plurality of spaced-apart, elongated positively charged electrodes, said positively charged electrodes being disposed such that one positively charged electrode is located parallel to and spaced-apart from at least one negatively charged electrode at substantially one-half the chosen distance therebetween, the electrodes forming an array of oppositely charged pairs of electrodes each pair forming an electrical discharge region therebetween suitable for providing excitation to a lasing gas for generating laser oscillation therein, a charging means for providing the appropriate electrical charge to the charged electrodes, switching means for controlling which discharges occur, means for preionizing the lasing gas in the discharge regions reflecting means located at one end of each of the lasing gas excitation regions, partially transmitting means located at the end of the lasing gas excitation region opposite to said reflecting means for coupling laser radiation out of the gas excitation regions forming thereby a plurality of parallel laser optical cavities suitable for supporting laser oscillation therein, and means for introducing and controlling the pressure of the lasing gas.

Preferably, the partially transmitting means is a single output coupler.

Benefits and advantages of the multiple discharge gas laser apparatus of the present invention include compact design allowing the use of a single output coupler and the association of each laser electrode with more than one discharge/lasing region, the generation of substantially parallel laser beams in the far field except for small variations due to mode structure, and the absence of moving parts.

BRIEF DESCRIPTION OF THE DRAWINGS

The accompanying drawings, which are incorporated in and form a part of the specification, illustrate three embodiments of the present invention and, together with the description, serve to explain the principles of the invention. In the drawings:

FIG. 1a is a schematic representation of a top view of the multiple discharge gas laser apparatus of the subject invention showing four each of the positively- and negatively-charged electrodes, two preionization electrodes, all oriented in a planar array, total reflecting elements and partial reflecting element forming seven laser oscillator cavities, and a lasing gas enclosure and inlet/outlet system. FIG. 1b is a schematic representation of the side view of the apparatus shown in FIG. 1a.

FIGS. 4a and 4b are generic circuit diagrams for two variations of the discharge electronics which permit discharges between adjacent electrodes to take place as desired by causing the appropriate switches to be closed. FIG. 4c shows a portion of the actual circuit utilized in the reduction to practice of the subject invention.

FIG. 5a is a schematic representation of the multiple discharge gas laser apparatus of the present invention showing preionization of the lasing medium using x-radiation applied from the side of the array of electrodes through an x-ray transmissive window, while

DETAILED DESCRIPTION OF THE INVENTION

Figure 2:
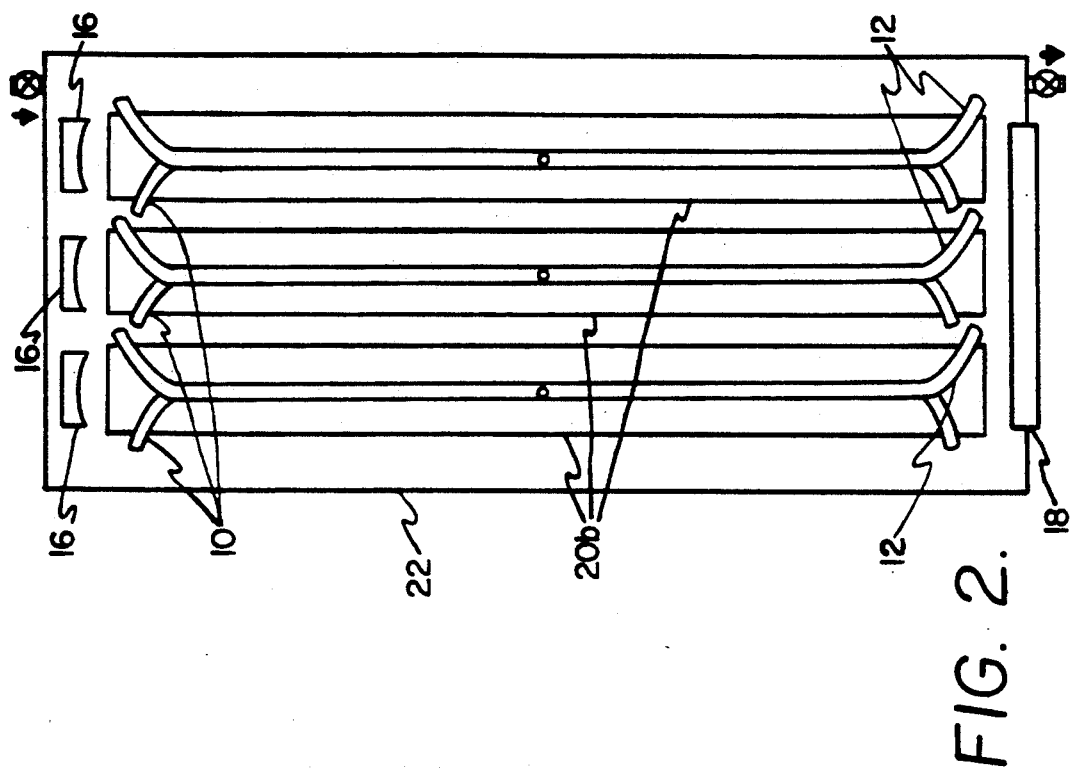
FIG. 2 is a schematic representation of a three-dimensional multiple discharge gas laser apparatus showing three planar arrays of the type illustrated in FIG. 1a hereof disposed in a side-by-side manner such that, with additional optics (not shown), gaseous discharges can be caused to take place between electrodes in two different planar arrays thereby providing numerous additional laser output beams.

Briefly, the subject invention in its broadest form includes a compact apparatus for simultaneously or individually generating a plurality of laser output beams in a selected pattern suitable for marking objects, for secure communications, and for remote sensing, among other uses therefor, where all of the electrodes providing lasing gas excitation are located in a single gas volume and share a single output coupler. In this manner, all of the output beams are parallel in the far field, to the extent variations in mode structure permit, without the necessity of undertaking detailed optical adjustments. Moreover, the focal plane of the output laser radiation is insensitive to significant positional variation of focusing optics utilized to increase the intensity thereof for marking purposes. Electrodes can be utilized for more than one discharge; that is, the direction of the discharge can be selected to involve any adjacent electrode having opposite charge polarity.

Reference will now be made in detail to the present preferred embodiment of the invention, an example of which is illustrated in the accompanying drawings. Similar or identical structure appearing in the Figures are marked with identical callouts. FIG. 1a is a schematic representation of a top view of the multiple discharge gas laser apparatus of the subject invention. Positively charged electrodes 10 and interspersed negatively charged electrodes 12 are shown to form seven gas discharge regions 14 suitable for providing excitation to a lasing gas which is caused to occupy discharge regions 14. Total reflectors 16 and partial reflector 18 form resonant laser optical cavities having discharge regions 14 therebetween. Preionizer electrodes 20a and 20b provide ionization to the gas by generating a low-energy discharge to the electrodes adjacent thereto and permit uniform discharge to occur between electrodes 10 and electrodes 12 at voltages well below the static breakdown voltage of the gas. One manner in which to construct such an electrode is by using a series of parallel resistors, inductors or capacitors connected to a common bus. Enclosure 22 provides a substantially gastight structure into which lasing gas is introduced and removed using entrance and exit valves 24 and 26, respectively. FIG. 1b is a schematic representation of the side view of the apparatus shown in FIG. 1a.

The deployment of the discharge electrodes 10, 12 in a common volume provides a significant simplification of design. That is, one electrode may be used for more than one discharge. Moreover, the reduction in size of the electrode assembly permits a single output coupler 18 to be used. This provides substantially parallel output laser beams except for minor variations in mode structure without the necessity of detailed alignment optics and procedures. The compact design also permits two preionizer electrodes to generate sufficient ionization required to uniformly discharge the gas between any of the electrode pairs. If the laser beams were to be generated from a plurality of separate lasers, each having its own cavity, one preionizer electrode would be required for each pair of electrodes.

In one embodiment of the subject invention having an 8-inch parallel length, ⅛-inch diameter copper electrodes spaced-apart ½-inch center-to-center, the laser output was found to be about 20 mJ/pulse for each beam of all seven output laser beams using 5 m concave total reflecting mirrors, an 81.2% reflecting (AR coated @ 9.4 microns for maximum transmission on one side) flat (both sides within 1 wavelength at 0.6 microns) germanium output coupler, and an applied voltage of 1750 V with 75 torr of a mixture of 65% He, 15% $N_2$, 18% $CO_2$, and 2% CO lasing gas mixture.

FIG. 2 is a schematic representation of a three-dimensional multiple discharge gas laser apparatus showing three planar arrays of the type illustrated in FIG. 1a hereof disposed in a parallel, side-by-side manner such that, with additional optics (not shown), gaseous discharges can be caused to take place between electrodes in two different planar arrays thereby providing numerous additional laser output beams as desired. Again, a single output coupler, 18, provides substantially parallel laser beams without need for significant alignment optics and procedures. In this manner, a three-dimensional marking pattern may be generated without having to move the object to be marked.

Whereas, FIGS. 1 and 2 illustrate a planar configuration of electrodes, there are situations where one desires the output laser beams to be free of shadowing from the electrodes; that is, it may be desirable that the output beams overlap. Moreover, it may be useful to utilize electrodes having larger diameter. Therefore, a configuration having separated planar arrays of positive and negative electrodes may be employed having all of the properties set forth hereinabove, except that if a lasing gas flow is desired in order to increase the firing rate of the array, it will take a longer time for the gas to traverse the biplanar array of electrodes than for the single planar configuration; thereby affecting the pulse rate for fast flow systems.

Figure 3:
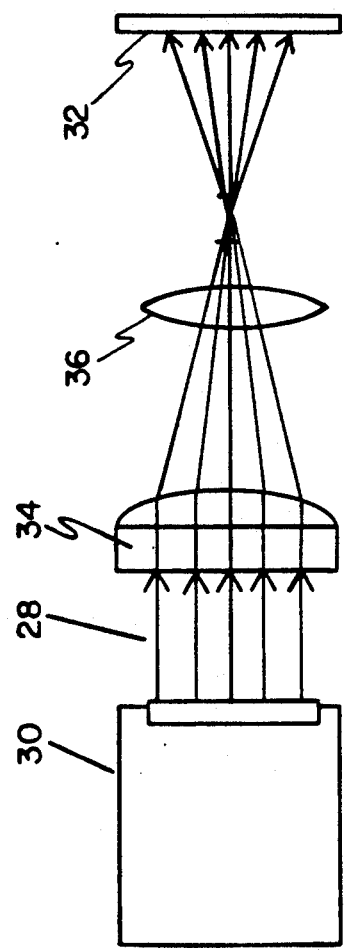
FIG. 3 is a schematic representation of one manner in which seven output laser beams from the laser illustrated in FIG. 1 hereof may be concentrated in space in order to mark an object.

FIG. 3 is a schematic representation of one manner in which the seven output laser beams 28 emerging from the laser illustrated in FIG. 1 hereof 30 may be concentrated in space in order to mark an object 32. Wedged element, 34, which may itself be the output coupler 18 reduces the linear size of the series of output beams to that which can be accommodated by the aperture of focusing lens 36. Dotted focusing lens 38 is shown to illustrate the concept that to first order, the image is not dependent on the distance from element 34 to object 32. It should be recalled that the laser beams 28 are substantially parallel in far field, necessitating but a single focusing element 36 to bring them all to one focus position on surface of object 32. This angle introduced by element 34 to each of laser beams 28 will cause them to come to distinct focal positions on object 32, the spacing among the focal positions of each beam being dependent on the angle imparted to each beam, and the focal length of lens 36. It would be apparent to one having ordinary skill in the art of laser marking after studying the present disclosure that in order to mark a number or letter on an object using the planar apparatus as illustrated in FIG. 1 hereof, one would be required to translate the object in a direction perpendicular to the plane of the laser output beams. Numerous ways of performing such a translation are available. However, no translation would be required if the apparatus illustrated in FIG. 2 was employed having a suitable number of planar lasing units to provide the desired pattern.

FIGS. 4a and 4b are generic circuit diagrams for two ways of configuring the discharge electronics which permit discharges between adjacent electrodes 10, 12 to take place as desired by causing the appropriate switches 40 to be closed. Typically, Vn= −450 V and Vp= +600 V. Neither the preionization electrodes nor the voltage supplies thereto are shown. In the circuit illustrated in FIG. 4a, it is necessary to fire switches 40 well before ionization of the gas occurs, and to open them well after the discharge, while for the circuit illustrated in FIG. 4b, it is necessary to fire the switches after the discharge and open them before the next ionization. FIG. 4c shows a portion of the actual circuit utilized in the reduction to practice of the subject invention including actual component values employed. $V_{trig}$ fires electronic switch 42. From the details of the circuits presented in FIG. 4 hereof, it is clear that any of the electrode pairs may be discharged by operating the appropriate switch, and that more than one discharge may be produced simultaneously. Ionization is achieved on all electrodes, independent of whether a given electrode is taking part in a discharge, using the ionization technique described in U.S. Pat. No. 4,748,635, for "Apparatus And Method For Uniform Ionization Of High Pressure Gaseous Media" issued to Edward J. McLellan on May 31, 1988, the teaching of which is hereby incorporated by reference herein.

Figure 5B:
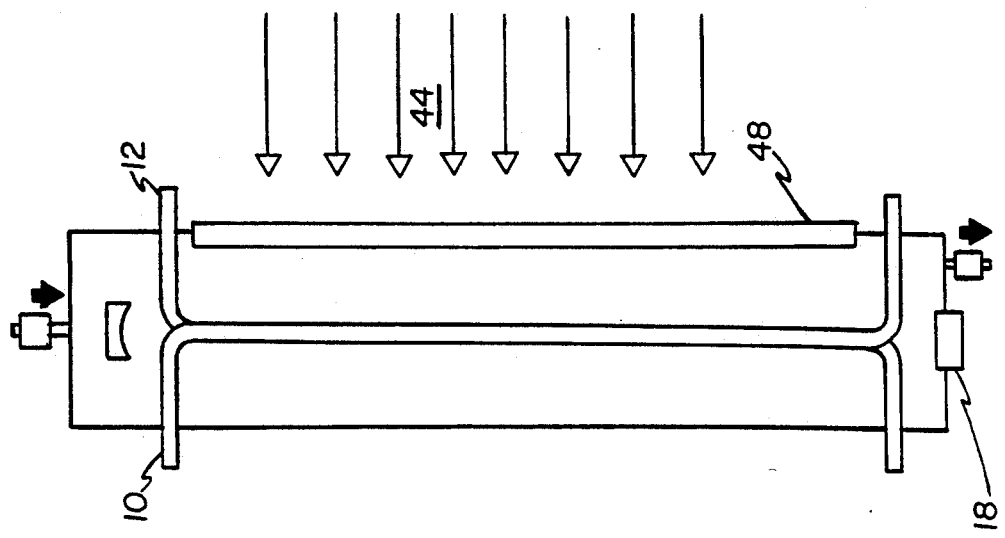
FIG. 5b shows irradiation from the top of the array.
Figure 5A:
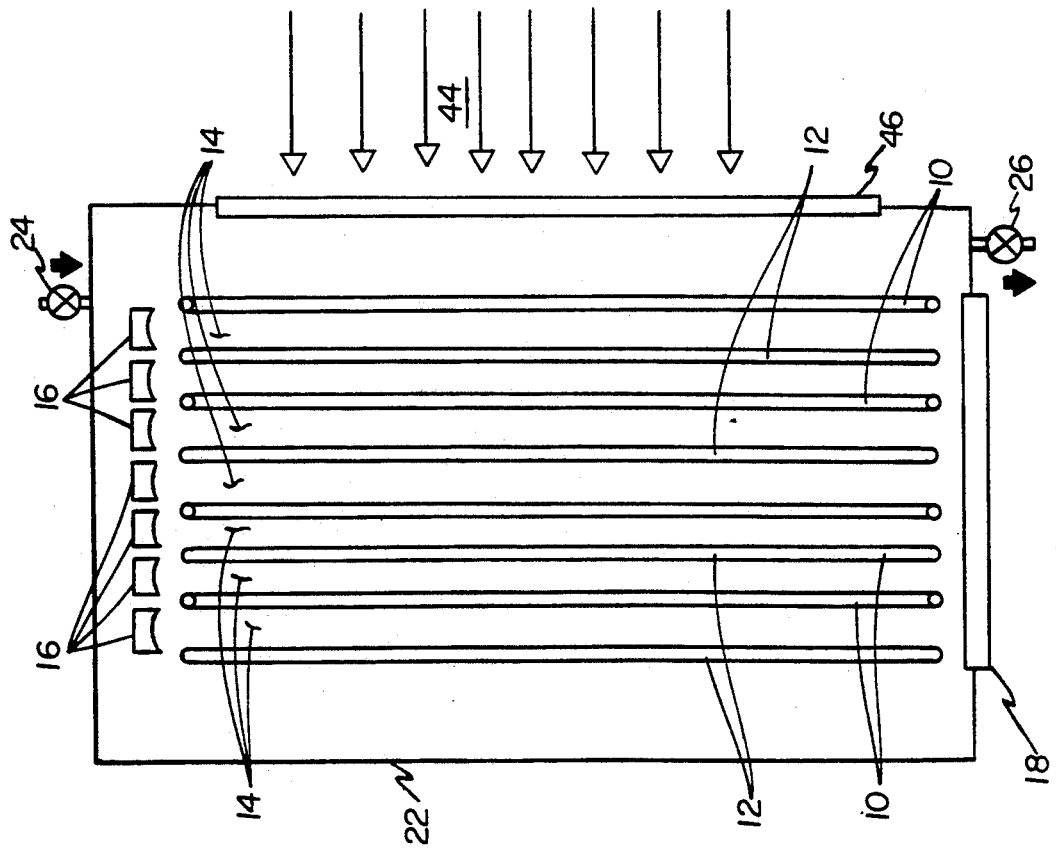
Figure 6B:
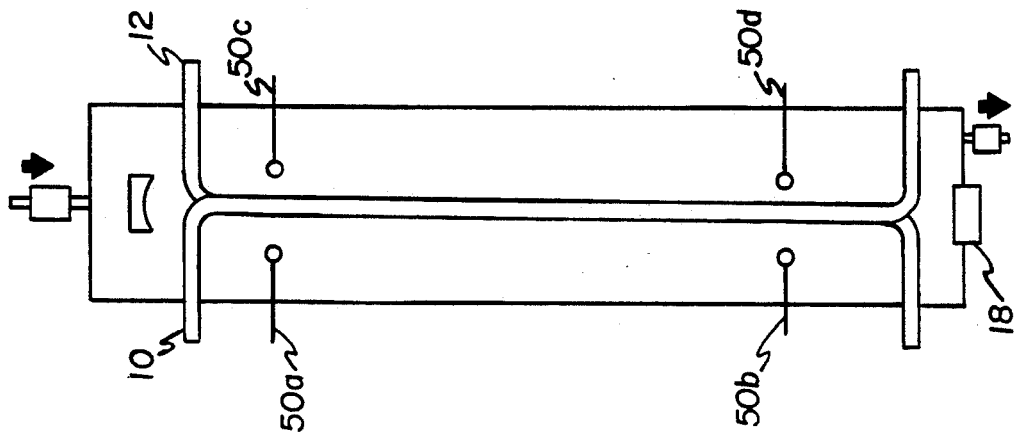
FIG. 6b shows the side view thereof.
Figure 6A:
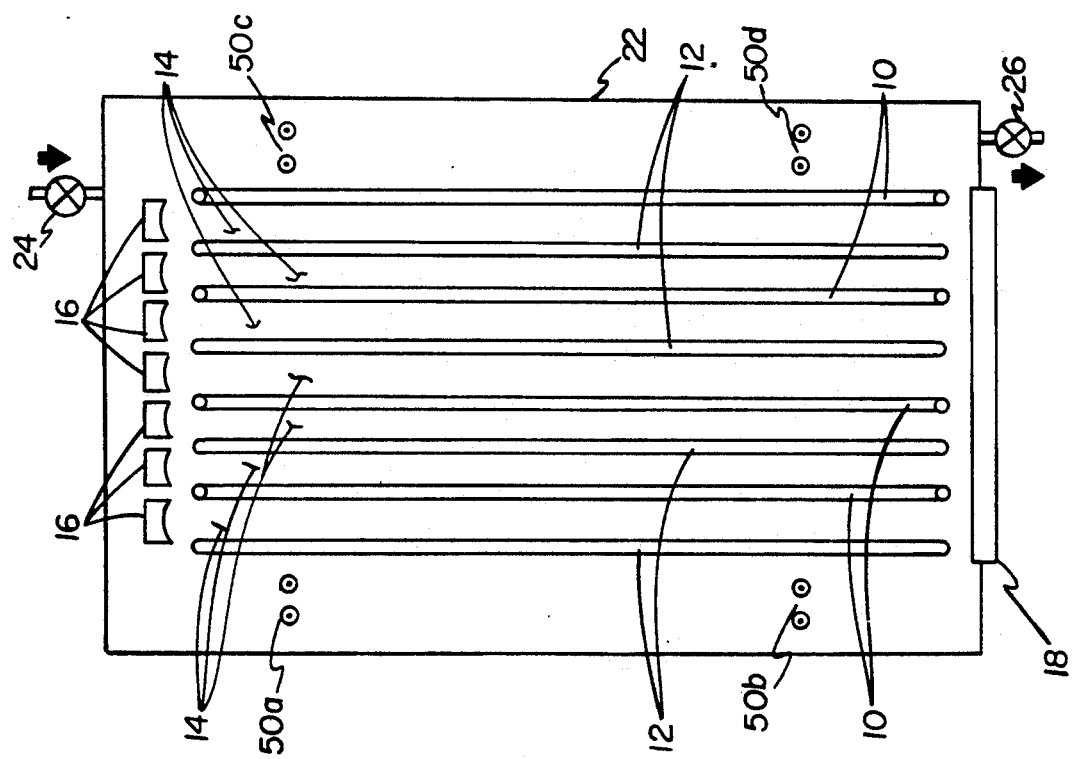
FIG. 6a is a schematic representation of the top view of the multiple discharge gas laser apparatus of my invention showing preionization of the lasing medium using uv irradiation generated using one or more electrical spark sources.

Other methods of preionization include x-ray and ultraviolet irradiation of the lasing gas and other embodiments of the electrical discharge technique set forth above. FIG. 5a is a schematic representation of the multiple discharge gas laser apparatus of the present invention showing preionization of the lasing medium using x-radiation 44 applied from the side of the array of electrodes through an x-ray transmissive window 46, while FIG. 5b shows irradiation from the top of the array through window 48. FIG. 6a illustrates preionization of the lasing medium using uv irradiation generated using one or more electrical spark sources 50a–d. FIG. 6b shows the side view thereof. Electrical sparks may be produced using pairs of wires having sufficient voltage thereon to break down in the gaseous medium. They can be located at various positions in the region of the main discharge electrodes.

Figure 7B:
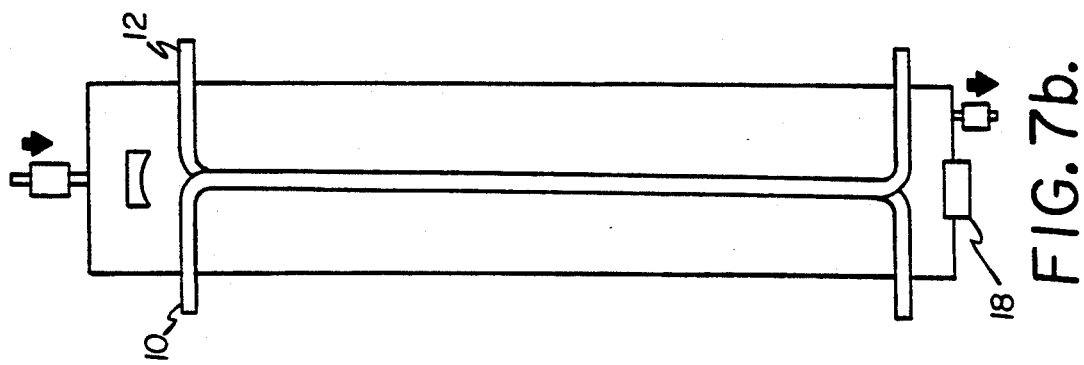
FIG. 7b shows the side view thereof.
Figure 7A:
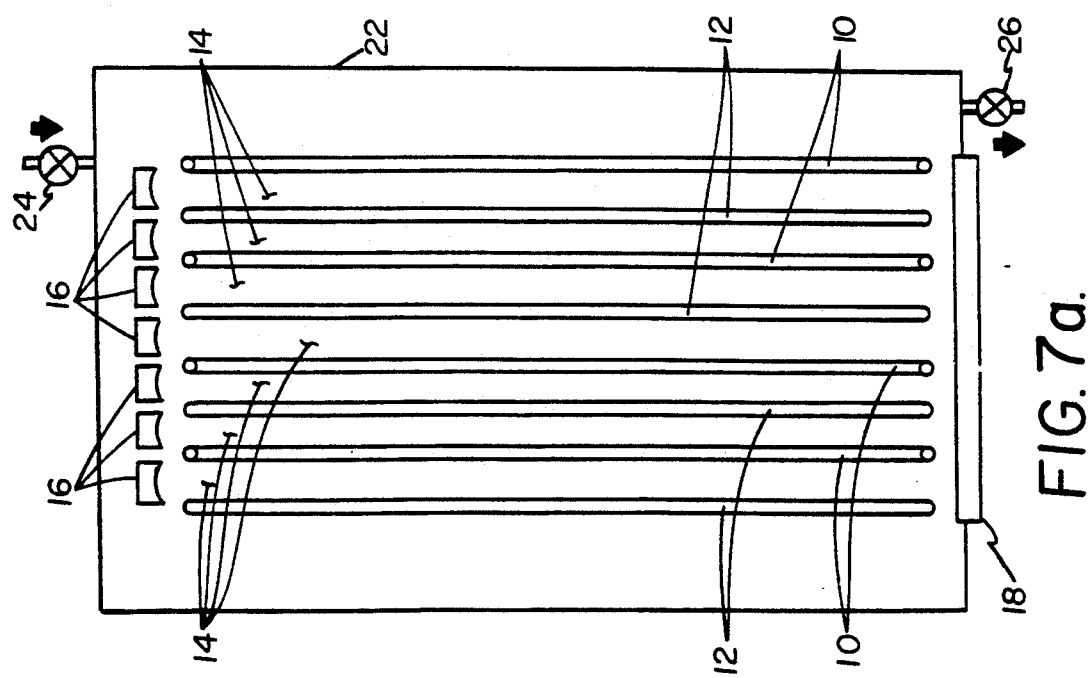
FIG. 7a is a schematic representation of the top view of the multiple discharge gas laser apparatus showing preionization of the lasing medium using rf energy. The radiofrequency is applied directly to the discharge electrodes along with the dc voltage which provides excitation to the lasing medium.
Figure 8B:
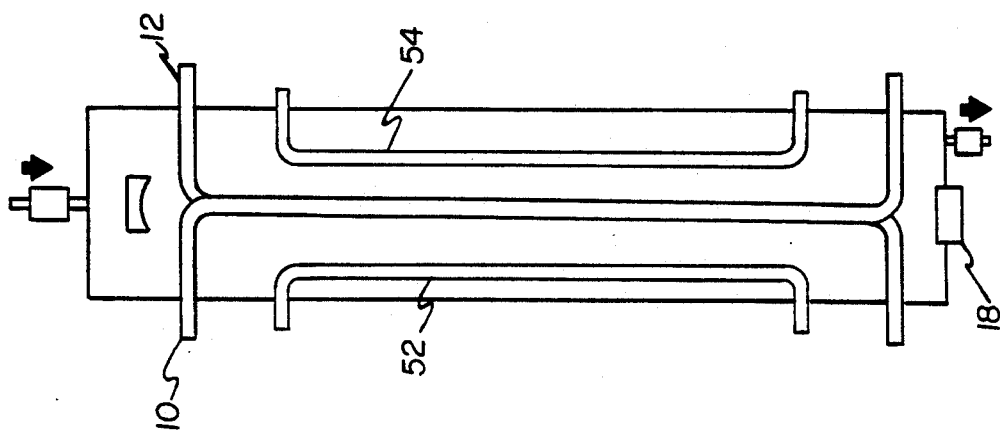
FIG. 8b shows the side
Figure 8A:
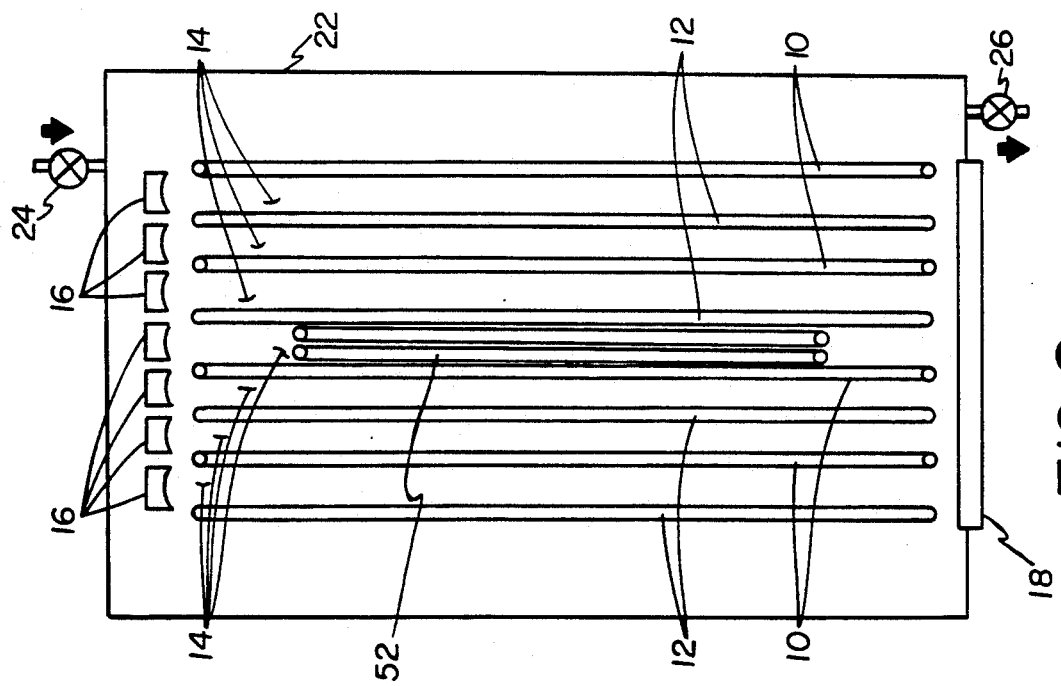
FIG. 8a is a schematic representation of the top view of the multiple discharge gas laser apparatus showing preionization of the lasing medium using one or more pairs of corona bars which are located in the region of the individual electrical discharges which supply the excitation to the lasing medium.

FIG. 7a shows preionization of the lasing medium using rf energy. The radiofrequency is applied directly to the discharge electrodes 10, 12 along with the dc voltage which provides the excitation to the lasing medium. FIG. 7b shows the side view thereof. FIG. 8a illustrates preionization of the lasing medium using one or more pairs of corona bars 52 which are located in the region of the individual electrical discharges, and which may be capacitively coupled to the electrical circuits for generating the discharges. FIG. 8b shows the side view thereof, illustrating also the use of a second pair of corona bars 54.

Figure 9:
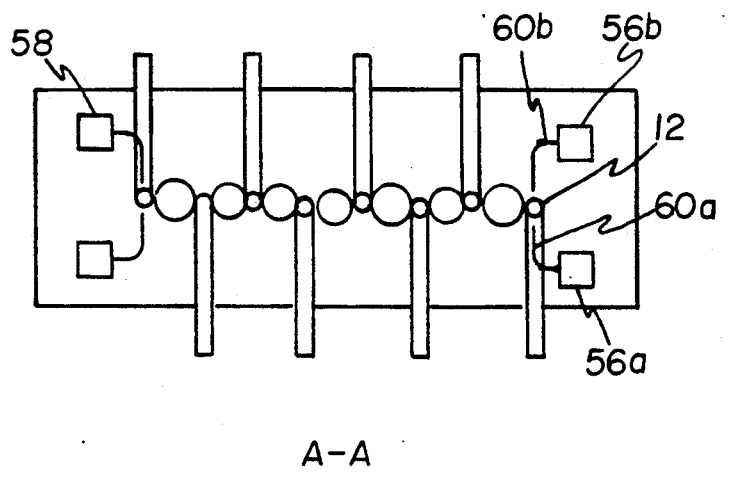
FIG. 9 is a schematic representation of the top view of the multiple discharge gas laser apparatus showing preionization using a variation of the preionization electrodes described in FIG. 1 hereof.
Figure 9B:
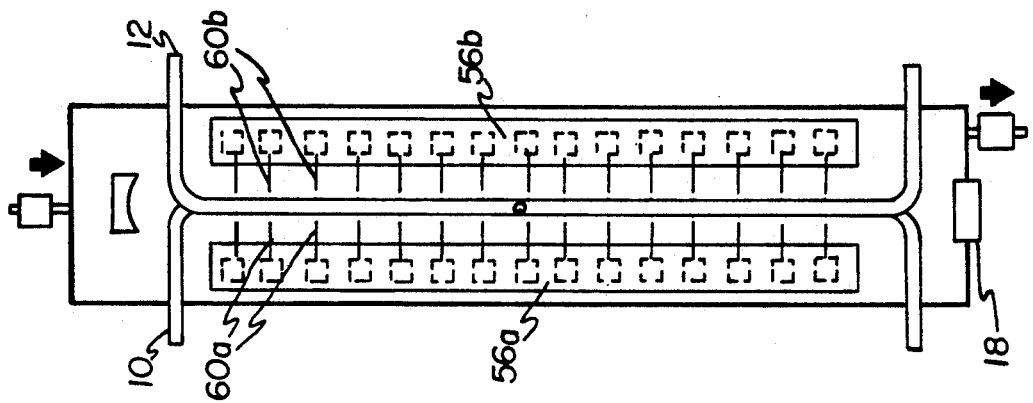
FIGS. 9b and 9c illustrate side view and cut views thereof, respectively.
Figure 9A:
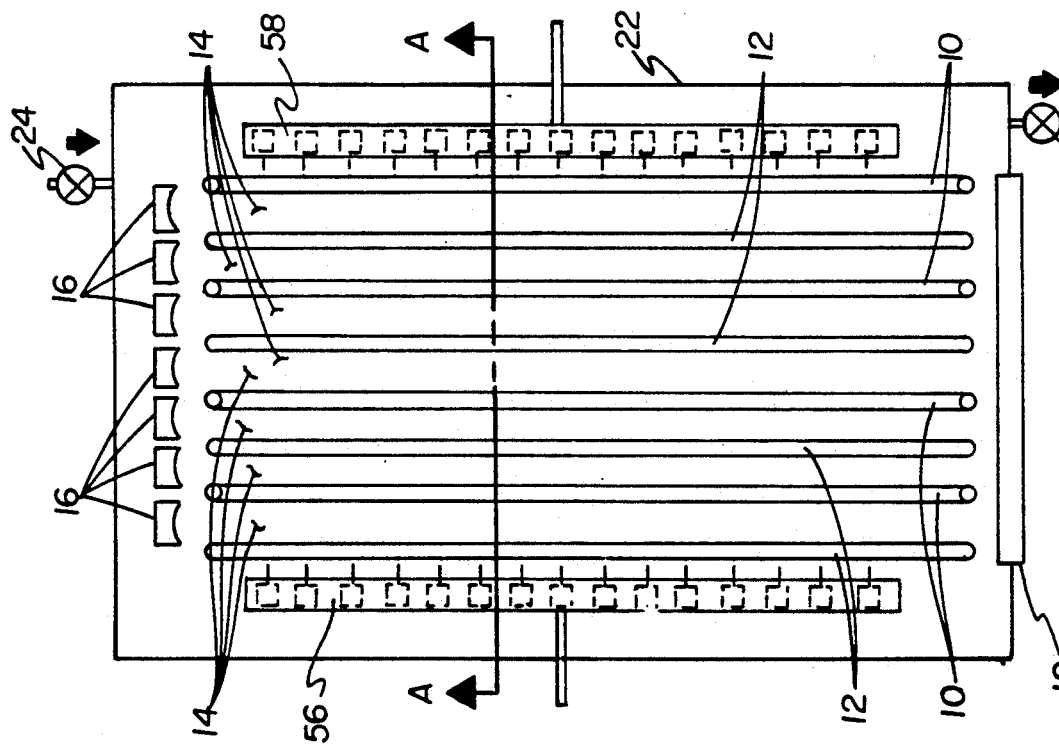
FIG. 9a illustrates two pairs of multiple-ballasted preionizer arrays which are out of the plane of the discharge electrodes, thereby providing more efficient ionization of the discharge array.
Figure 9C:
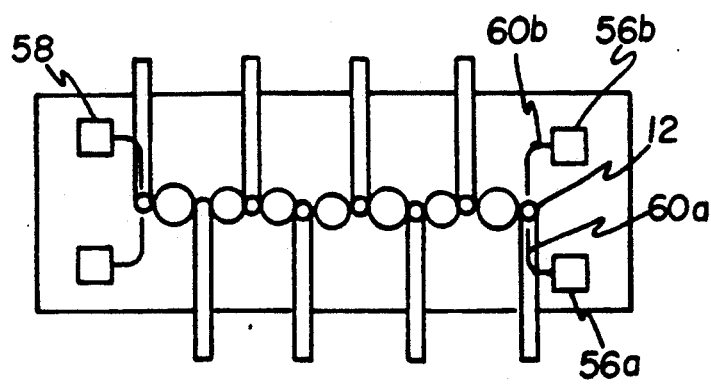

FIG. 9 illustrates preionization using a variation of the preionization electrodes described in FIG. 1 hereof. FIG. 9a shows two pairs of multiple-ballasted preionizer arrays 56, 58, each pair having one preionizer array disposed above and one disposed below the plane of the discharge electrodes 10, 12, thereby providing more efficient ionization for the discharge array. Leads 60a,b from an array pair (56a,b) may be arranged such that an electrical discharge occurs from lead 60a to electrode 12, and then from electrode 12 to lead 60b. FIGS. 9b and 9c illustrate side view and cut views thereof, respectively.

The foregoing description of several preferred embodiments of the invention has been presented for purposes of illustration and description. It is not intended to be exhaustive or to limit the invention to the precise form disclosed, and obviously many modifications and variations are possible in light of the above teaching. For example, it would be apparent to one having ordinary skill in the art of lasers, after studying the subject disclosure, that the each of the concave mirrors described therein could be replaced by a diffraction grating, each with an accompanying lens to provide a stable resonator cavity when used in cooperation with the single, planar output coupler, if a plurality of laser wavelengths is desirable. This might be the situation for communications and for remote chemical or other remote sensing applications. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A multiple discharge laser apparatus capable of generating a plurality of laser oscillations in a lasing gas, said apparatus comprising in combination: a plurality of spaced-apart, elongated, negatively charged electrodes having a chosen distance therebetween, said negatively charged electrodes being disposed such that the long dimension of each electrode is substantially parallel, a plurality of spaced-apart, elongated positively charged electrodes, said positively charged electrodes being disposed such that one of said positively charged electrodes is located parallel to and spaced-apart from at least one of said negatively charged electrodes at substantially one-half the chosen distance therebetween, said negatively charged electrodes and said positively charged electrodes forming an array of oppositely charged pairs of electrodes, each pair forming an electrical discharge region therebetween, providing excitation to a lasing gas for generating laser oscillation therein, charging means for providing an electrical charge to said positively charged electrodes and said negatively charged electrodes, switching means for controlling which of said negatively charged electrodes discharges to said positively charged electrodes adjacent thereto, means for preionizing the lasing gas in the electrical discharge region, reflecting means located at one end of each of the lasing gas excitation regions, partially transmitting means located at the end of the lasing gas excitation region opposite to said reflecting means for coupling laser radiation out of the gas excitation regions forming thereby a plurality of parallel laser optical cavities supporting laser oscillations therein, and means for introducing and controlling the pressure of the lasing gas.

2. The multiple discharge gas laser as described in claim 1, wherein said plurality of positive electrodes and said plurality of negative electrodes form a single, substantially planar array of oppositely charged pairs of electrodes.

3. The multiple discharge gas laser apparatus as described in claim 1, further comprising a plurality of parallel, spaced-apart arrays of oppositely charged pairs of electrodes, each pair forming an electrical discharge region therebetween suitable for providing excitation to a lasing gas for generating laser oscillation therein, each of said arrays having a first outer electrode and a second outer electrode, wherein an electrode in one of said arrays and the nearest of said electrodes bearing the opposite charge located in a neighboring one of said parallel arrays forms an electrical discharge region therebetween suitable for providing excitation to the lasing gas for generating laser oscillation therein, reflecting means located at one end of each of the lasing gas excitation regions, and partially transmitting means located at the end of the lasing gas excitation region opposite to said reflecting means for coupling laser radiation out of the gas excitation regions, thereby forming a three-dimensional array of parallel laser optical cavities supporting laser oscillations therein.

4. The apparatus as described in claims 1, 2, or 3, wherein said partially transmitting means includes a single output coupler through which a portion of all of the laser oscillations pass.

5. The apparatus as described in claim 4, wherein said reflecting means includes diffraction gratings.

6. The multiple discharge laser apparatus of claim 1, wherein said array of oppositely charged pairs of electrodes further comprises a first outer electrode and a second outer electrode, said means for preionizing the lasing gas comprises a first elongated preionizer electrode disposed parallel to and spaced-apart from said first outermost electrode of the array such that the long axis of said first preionizer electrode is substantially parallel to the long axis of said first outermost electrode, a second elongated preionizer electrode disposed parallel to and spaced-apart from said second outermost electrode of the array such that the long axis of said second preionizer electrode is substantially parallel to the long axis of said second outermost electrode, said apparatus further comprising means for charging said first preionizer electrode and said second preionizer electrode and for controlling the discharge of said first preionizer electrode to said first outermost electrode and said second preionizer electrode to said second outermost electrode.

7. The multiple discharge laser apparatus as described in claim 1, wherein said means for preionizing the lasing gas is selected from the group consisting of uv ionization means, x-ray ionization means, and electric discharge ionization means.

8. A dot matrix laser apparatus generating a plurality of laser oscillations in a lasing gas, said apparatus comprising in combination: a plurality of spaced-apart, elongated, negatively charged electrodes having a chosen distance therebetween, said negatively charged electrodes being disposed such that the long dimension of each electrode is substantially parallel, a plurality of spaced-apart, elongated positively charged electrodes, said positively charged electrodes being disposed such that one of said positively charged electrodes is located parallel to and spaced-apart from at least one of said negatively charged electrodes at substantially one-half the chosen distance therebetween, said negatively charged electrodes and said positively charged electrodes forming an array of oppositely charged pairs of electrodes, each pair forming an electrical discharge region therebetween, providing excitation to a lasing gas for generating laser oscillation therein, charging means for providing an electrical charge to said positively charged electrodes and said negatively charged electrodes, switching means for controlling which of said negatively charged electrodes discharges to said positively charged electrodes adjacent thereto, means for preionizing the lasing gas in the electrical discharge region, reflecting means located at one end of each of the lasing gas excitation regions, partially transmitting means located at the end of the lasing gas excitation region opposite to said reflecting means for coupling laser radiation out of the gas excitation regions forming thereby a plurality of parallel laser optical cavities supporting laser oscillation therein, and means for introducing and controlling the pressure of the lasing gas; whereby said plurality of laser oscillations are generated to produce said dot matrix, thereby providing an apparatus for marking objects.

9. The dot matrix gas laser as described in claim 8, wherein said plurality of positive electrodes and said plurality of negative electrodes form a single, substantially planar array of oppositely charged pairs of electrodes.

10. The dot matrix gas laser as described in claim 8, further comprising a plurality of parallel, spaced-apart arrays of oppositely charged pairs of electrodes, each pair forming an electrical discharge region therebetween providing excitation to a lasing gas and generating laser oscillation in the gas, each of said arrays having a first outer electrode and a second outer electrode, wherein an electrode in one of said arrays and the nearest of said electrodes bearing the opposite charge located in an adjacent array forms an electrical discharge region therebetween providing excitation to the lasing gas and generating laser oscillation in the gas, reflecting means located at one end of each of the lasing gas excitation regions, and partially transmitting means located at the end of the lasing gas excitation region opposite to said reflecting means for coupling laser radiation out of the gas excitation regions, thereby forming a three-dimensional array of parallel laser optical cavities supporting laser oscillations therein.

11. The apparatus as described in claims 8, 9, or 10, wherein said partially transmitting means includes a single output coupler through which a portion of all of the laser oscillations pass.

12. The apparatus as described in claim 11, further comprising an element for adjusting angles for the laser output beam from each of the lasing gas excitation regions, and a focusing lens for increasing intensity of each laser output at the image plane of said lens.

13. The apparatus as described in claim 12, further comprising means for moving the object to be marked in a direction substantially perpendicular to the plane of the array of said oppositely charged pairs of electrodes.

14. The dot matrix laser apparatus of claim 6, wherein said array of oppositely charged pairs of electrodes further comprises a first outer electrode and a second outer electrode, said means for preionizing the lasing gas comprises a first elongated preionizer electrode disposed parallel to and spaced-apart from said first outermost electrode of the array such that the long axis of said first preionizer electrode is substantially parallel to the long axis of said first outermost electrode, a second elongated preionizer electrode disposed parallel to and spaced-apart from said second outermost electrode of the array such that the long axis of said second preionizer electrode is substantially parallel to the long axis of said second outermost electrode, said apparatus further comprising means for charging said first preionizer electrode and said second preionizer electrode and for controlling the discharge of said first preionizer electrode to said first outermost electrode and said second preionizer electrode to said second outermost electrode.

15. The dot matrix lasing apparatus as described in claim 8, wherein said means for preionizing the lasing gas is selected from the group consisting of uv ionization means, x-ray ionization means, and electric discharge ionization means.

* * * * *